(12) United States Patent
Howard et al.

(10) Patent No.: US 7,927,738 B2
(45) Date of Patent: Apr. 19, 2011

(54) BATTERY HAVING IMPROVED HEADSPACE INSULATOR

(75) Inventors: William G. Howard, Roseville, MN (US); David P. Haas, Brooklyn Park, MN (US); Jeffrey S. Lund, Forest Lake, MN (US)

(73) Assignee: Medtronic, Inc., Minneapolis, MN (US)

( * ) Notice: Subject to any disclaimer, the term of this patent is extended or adjusted under 35 U.S.C. 154(b) by 798 days.

(21) Appl. No.: 11/861,341

(22) Filed: Sep. 26, 2007

(65) Prior Publication Data
US 2008/0008931 A1 Jan. 10, 2008

Related U.S. Application Data

(62) Division of application No. 10/723,317, filed on Nov. 26, 2003, now Pat. No. 7,294,432.

(51) Int. Cl.
*H01M 2/02* (2006.01)
(52) U.S. Cl. ........ 429/181; 429/185; 429/175; 429/129; 429/72

(58) Field of Classification Search .................. 429/181, 429/179, 178, 180, 176, 175, 174, 185, 65, 429/95, 72, 186, 129
See application file for complete search history.

(56) References Cited

U.S. PATENT DOCUMENTS

| 6,040,082 A * | 3/2000 | Haas et al. ................ 429/163 |
| 6,224,999 B1 | 5/2001 | Probst et al. |

* cited by examiner

*Primary Examiner* — Raymond Alejandro

(57) ABSTRACT

A headspace insulator for a battery cell operatively coupled to circuitry within an implantable medical device in including one or more of the following: (a) a body of electrically and thermally insulating material disposed between a battery electrode assembly and a battery cover, (b) a receiving area within the body that receives and isolates a battery feedthrough pin, (c) an indentation within the receiving area retaining the feedthrough pin within the receiving area, (d) a raised portion coupled to a battery cover providing an air gap between the cover and the headspace insulator near case-to-cover weld areas, (e) a feedthrough aperture adapted to receive a feedthrough assembly, (f) a pin aperture that receives the feedthrough pin, (g) a fillport aperture for electrolyte fluid flow through the headspace insulator, and (h) a slot that locates a battery weld bracket and isolates it from the feedthrough pin.

8 Claims, 7 Drawing Sheets

BATTERY HAVING IMPROVED HEADSPACE INSULATOR

CROSS REFERENCE TO PRIORITY APPLICATION

This application is a divisional of application Ser. No. 10/723,317, filed Nov. 26, 2003, now issued as U.S. Pat. No. 7,294,432.

FIELD OF THE INVENTION

The present invention relates to the field of power sources such as primary batteries, capacitors and rechargeable batteries for devices such as an implantable medical device (IMD). More particularly, the present invention relates to an improved headspace insulator for an electrochemical cell adapted to be operatively coupled to electronic circuitry within an IMD. Furthermore, the present invention relates to electrochemical cells comprising a novel headspace insulator and a method of fabricating an electrochemical cell incorporating said headspace insulator.

BACKGROUND OF THE INVENTION

Implantable medical devices are used to treat patients suffering from a variety of conditions. An example of an IMD include implantable pulse generators (e.g., a cardiac pacemaker) and implantable cardioverter-defibrillators (ICDs), which are electronic medical devices that monitor the electrical activity of the heart and provide electrical stimulation to one or more of the heart chambers, when necessary. For example, a pacemaker senses an arrhythmia, i.e., a disturbance in heart rhythm, and provides appropriate electrical stimulation pulses, at a controlled rate, to selected chambers of the heart in order to correct the arrhythmia and restore the proper heart rhythm. The types of arrhythmias that may be detected and corrected by pacemakers include bradycardias, which are unusually slow heart rates, and certain tachycardias, which are unusually fast heart rates.

Implantable cardioverter-defibrillators also detect arrhythmias and provide appropriate electrical stimulation pulses to selected chambers of the heart to correct the abnormal heart rate. In contrast to pacemakers, however, an ICD can also provide more power. This is because ICDs are designed to correct fibrillation, which is a rapid, unsynchronized quivering of one or more heart chambers, and severe tachycardia, where the heartbeats are very fast but coordinated. To correct such arrhythmias, an ICD delivers a low, moderate, or high-energy shock to the heart.

In order to perform their pacing and/or cardioverting-defibrillating functions, pacemakers and ICDs must have an energy source, e.g., a battery. An example of a prior battery is shown with reference to FIG. 1. The exploded perspective view of a prior battery solution is shown having a battery cover 10 and a headspace insulator 12 along with a battery case 14 and an electrode assembly 16. Battery cover 10 includes a feedthrough 18 through which feedthrough pin 20 is inserted. The feedthrough pin 20 is conductively insulated from the cover 10 by glass where it passes through the cover 10. The feedthrough pin 20 is generally bent to align itself with connector tabs 22 extending from electrode assembly 16. The battery cover 10 also includes a fill port 24 used to introduce an appropriate electrolyte solution after which the fill port 24 is hermetically sealed by any suitable method.

The headspace insulator 12 is generally located below battery cover 10 and above a coil insulator in the headspace above the coiled electrode assembly 16 and below the cover 10. The headspace insulator 12 is provided to electrically insulate the feedthrough pin 20 from case 14 and battery cover 10. The headspace insulator 12 forms a chamber in connection with the upper surface of the coil insulator isolating the feedthrough pin 20 and the connector tabs 22 to which it is attached.

While these prior battery solutions operate well to provide an energy source for an IMD there is room for improvement in the headspace design. Specifically, these prior solutions cannot hold the feedthrough pin in a uniform isolated location. In prior battery designs, a bend or a coil is formed in the feedthrough pin to act as a strain relief. This prevents the feedthrough pin from being in a rigid condition, such as if the pin was connected directly to a tab without a bend in the feedthrough pin. However, with a bend in the feedthrough pin there is little give to prevent any fatigue of the wire or the joint where the feedthrough pin enters the feedthrough through the glass during a shock or vibration event. Therefore, the bend acts as a cushion.

The prior headspace insulator is typically a thermoformed thin-walled plastic component. It is not precisely located with respect to other internal battery components and is susceptible to deformation during the assembly process. While this condition does not present any compromise to the intent of the headspace insulator design, it can affect manufacturing yields.

One of the variables associated with prior coiled electrode battery designs and assembly methods involves the length of the feedthrough pin between the pin-to-glass interface of the feedthrough and the pin-to-tab weld. This length is determined during the pin-to tab welding operation. Previous coiled electrode battery designs employed a "hinged" cover. The design welded the feedthrough pin to the tab(s) of one electrode of the coiled electrode assembly. The electrode assembly was then seated into the case. The cover was then seated into the case to complete the assembly. The feedthrough pin was shaped to have a coil or bend placed in the pin prior to welding the pin to the tab(s). The coil or bend in the pin was located between the glass of the feedthrough and the pin to tab weld. This coil offered strain relief to the pin, the pin-to-tab weld, and the pin-to-glass interface during electrode insertion into the case and subsequent cover insertion into the case. Due to the variations in the shape of the feedthrough pin, caused from material springiness, general handling of the pin, and the tab weld personnel, the length of the pin between the pin-to-glass interface and the pin-to-tab weld varied from one assembly to the next. This non-uniform pin length caused the case to cover insertion processing to be inconsistent.

Attempts were made to prevent the stresses on the weld by providing a coil in the feedthrough pin. However, this increased the length of the feedthrough pin, which in turn increased the resistance of the pin. This was an undesirable result as the resistance consumed power from the battery.

BRIEF SUMMARY OF THE INVENTION

A battery in embodiments of the invention may include one or more of the following features: (a) an electrode assembly having a second electrode tab and a first electrode tab, (b) a battery case having the electrode assembly within the battery case, (c) a battery cover having a feedthrough, the battery cover being coupled to the battery case, (d) a headspace insulator having a receiving area, (e) a feedthrough assembly having a ferrule, feedthrough pin, and insulating member, the feedthrough pin having a distal end locked into the receiving area and coupled to the second electrode tab, (f) a weld bracket coupled to the battery cover, the weld bracket being coupled to the first electrode tab, (g) a second electrode opening to accept the second electrode tab, and a first electrode opening to accept the first electrode tab, (h) a case liner, (i) a coil insulator having slits, the coil insulator and the case liner enclosing the electrode assembly with the second electrode tab and the first electrode tab extending through the slits.

A headspace insulator for a battery in an IMD in one or more embodiments of the present invention may include one or more of the following features: (a) a body of electrically and thermally insulating material disposed between a battery electrode assembly and a battery cover, (b) a receiving area within the body that receives and isolates a battery feedthrough pin, (c) an indentation within the receiving area that holds the feedthrough pin in place once the feedthrough pin is within the receiving area, (d) a raised portion that couples to a battery cover and provides an air gap between the cover and the headspace insulator near a battery case to battery cover weld areas, (e) a feedthrough aperture that receives a battery feedthrough assembly, (f) a pin aperture that receives the feedthrough pin, (g) a fillport aperture that allows an electrolyte to pass through the headspace insulator into the electrode assembly, and (h) a slot that locates a battery weld bracket and isolates it from the feedthrough pin.

Methods of manufacturing a battery for an IMD according to the present invention may include one or more of the following steps: (a) placing a case liner and a coil insulator over an electrode assembly, (b) coupling a weld bracket to a battery cover, (c) coupling a headspace insulator to the battery cover, (d) bending the feedthrough pin, (e) locking a distal end of the feedthrough pin into a receiving area in the headspace insulator, (f) aligning the headspace insulator with the electrode assembly so a second electrode tab on the electrode assembly is accepted within a second electrode opening in the headspace insulator and a first electrode tab on the electrode assembly is accepted within a first electrode opening in the headspace insulator, (g) coupling the second electrode tab and the distal end of the feedthrough pin, (h) coupling the first electrode tab and the weld bracket, (i) placing the electrode assembly within the battery case, (j) coupling the battery cover to the battery case, (k) filling the battery case with an electrolyte through a fill port, and (l) sealing the battery with a closing ball and button.

DETAILED DESCRIPTION OF THE ILLUSTRATED EMBODIMENTS

Figure 1:
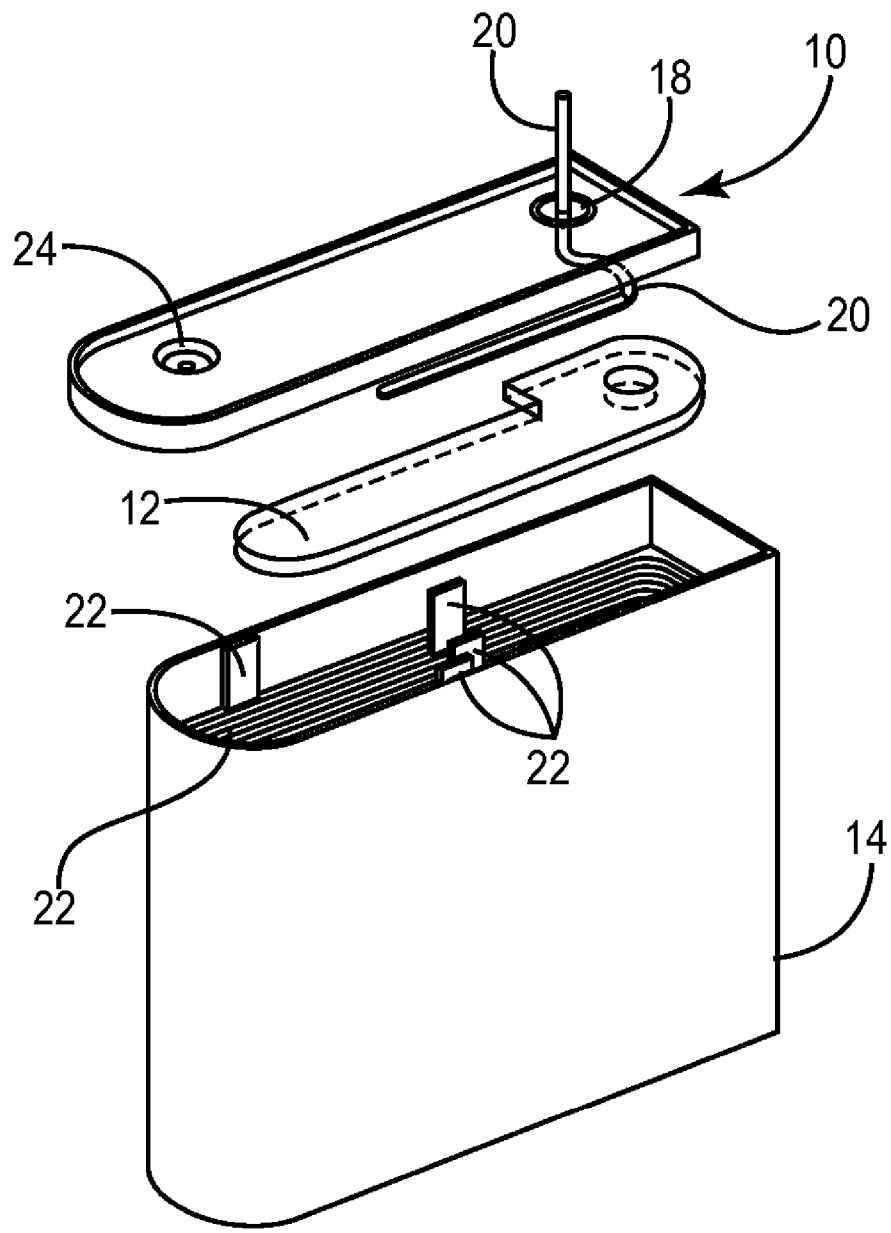
FIG. 1 is an exploded perspective view of a prior battery design.

The following discussion is presented to enable a person skilled in the art to make and use the invention. Various modifications to the illustrated embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the invention. Skilled artisans will recognize the examples provided herein have many useful alternatives fall within the scope of the invention.

The present invention is not limited to ICDs and may be employed in many various types of electronic and mechanical devices for treating patient medical conditions such as pacemakers, defibrillators, neurostimulators, and therapeutic substance delivery pumps. It is to be further understood; moreover, the present invention is not limited to high current batteries and may be utilized for low or medium current batteries and for rechargeable batteries as well. For purposes of illustration only, however, the present invention is below described in the context of high current batteries.

As used herein, the terms battery or batteries include a single electrochemical cell or cells. Batteries are volumetrically constrained systems in which the components in the case of the battery cannot exceed the available volume of the battery case. Furthermore, the relative amounts of some of the components can be important to provide the desired amount of energy at the desired discharge rates. A discussion of the various considerations in designing the electrodes and the desired volume of electrolyte needed to accompany them in, for example, a lithium/silver vanadium oxide (Li/SVO) battery is discussed in U.S. Pat. No. 5,458,997 (Crespi et al.). Generally, however, the battery must include the electrodes and additional volume for the electrolyte required to provide a functioning battery.

Figures 2, 3:
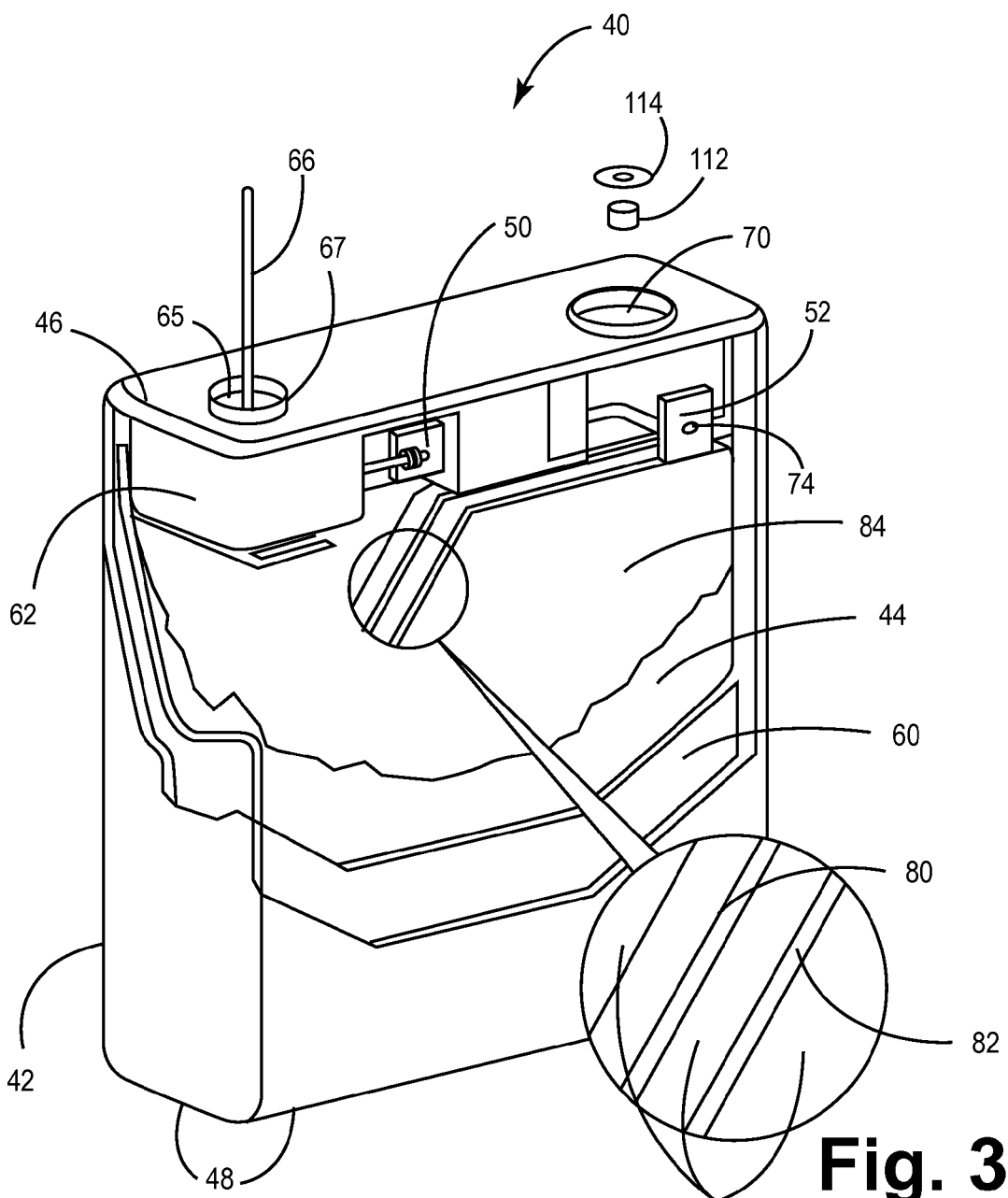
FIG. 2 is a cutaway perspective view of a battery case, electrode assembly, case liner, coil insulator, battery cover, and a headspace insulator in an embodiment according to the present invention.
FIG. 3 is a cutaway perspective view of the electrode assembly as shown in FIG. 2.

With reference to FIG. 2, an exploded perspective view of a battery case, electrode assembly, case liner, coil insulator, battery cover, and a headspace insulator in an embodiment according to the present invention is shown. A battery 40 according to the present invention includes a case 42 and an electrode assembly 44. Case 42 is generally made of a medical grade titanium, however, it is contemplated that case 42 could be made of almost any type of metal such as aluminum and stainless steel, as long as the metal is compatible with the battery's chemistry in order to prevent corrosion. Further, it is contemplated case 42 could be manufactured from most any process including but not limited to machining, casting, drawing, or metal injection molding. Case 42 is designed to enclose electrode assembly 44 and be sealed by a battery cover 46. While sides 48 of case 42 are generally planar it is contemplated sides 48 could be generally arcuate in shape. This construction would provide a number of advantages including the ability to accommodate one of the curved or arcuate ends of a coiled electrode assembly 44. Arcuate sides could also nest within an arcuate edge of an IMD such as an implantable cardiac defibrillator.

The details regarding construction of electrode assembly 44, such as positive and negative electrodes, electrode pouches, etc., are secondary to the present invention and will be described generally below with a more complete discussion being found in, e.g., U.S. Pat. No. 5,458,997 (Crespi et al.).

Electrode assembly 44 is generally a wound or coiled structure similar to those disclosed in, e.g., U.S. Pat. No. 5,486,215 (Kelm et al.). However, other electrode assembly configurations such as a folded and interleaved electrodes disclosed in, e.g., U.S. Pat. No. 5,154,989 (Howard et al.) or simply individual electrodes. As a result, the electrode assemblies typically exhibit two generally planar sides, bounded by two opposing generally arcuate edges and two opposing generally planar ends. The composition of the electrode assemblies can vary, although one illustrated electrode assembly includes a wound core of lithium/silver vanadium oxide (Li/SVO) battery as discussed in, e.g., U.S. Pat. No. 5,458,997 (Crespi et al.). Other battery chemistries are also anticipated, such as those described in U.S. Pat. No. 5,180,642 (Weiss et al) and U.S. Pat. Nos. 4,302,518 and 4,357,215 (Goodenough et al).

With reference to FIG. 3, a cutaway perspective view of the electrode assembly as shown in FIG. 2 is shown. Electrode assembly 44 generally includes a second electrode 80, a first electrode 82, and a porous, electrically non-conductive separator material 84 encapsulating either or both of second electrode 80 and first electrode 82. These three components are generally placed together and wound to form electrode assembly 44. Second electrode 80 of electrode assembly 44 can comprise a number of different materials including second electrode active material located on a second electrode conductor element. In this embodiment the second electrode is an anode in the case of a primary cell or the negative electrode in the case of a rechargeable cell. Examples of suitable electrode active materials include, but are not limited to: alkali metals, materials selected from Group IA of the Periodic Table of Elements, including lithium, sodium, potassium, etc., and their alloys and intermetallic compounds including, e.g., Li—Si, Li—B, and Li—Si—B alloys and intermetallic compounds, insertion or intercalation materials such as carbon, or tin-oxide. Examples of suitable materials for anode or negative electrode conductor element include, but are not limited to: stainless steel, nickel, or titanium. The details regarding construction of electrode assembly 44, such as positive and negative electrodes, are described with a more complete discussion being found in, e.g., U.S. Pat. No. 5,439,760 (Howard et al.).

First electrode portion 82 of electrode assembly 44 generally includes a first electrode active material located on a first electrode current collector, which also conducts the flow of electrons between the first electrode active materials, and first electrode terminals of electrode assembly 44. In this embodiment the first electrode is a cathode in the case of a primary cell or the positive electrode in the case of a rechargeable cell. Examples of materials suitable for use as first electrode active material include, but are not limited to: a metal oxide, a mixed metal oxide, a metal, and combinations thereof. Suitable first electrode active materials include silver vanadium oxide (SVO), copper vanadium oxide, copper silver vanadium oxide (CSVO), manganese dioxide, titanium disulfide, copper oxide, copper sulfide, iron sulfide, iron disulfide, and fluorinated carbon, and mixtures thereof, including lithiated oxides of metals such as manganese, cobalt, and nickel.

Generally, cathode or positive electrode active material comprises a mixed metal oxide formed by chemical addition, reaction or otherwise intimate contact or by thermal spray coating process of various metal sulfides, metal oxides or metal oxide/elemental metal combinations. The materials thereby produced contain metals and oxides of Groups IB, IIB, IIIB, IVB, VB, VIB, VIIB, and VIII of the Periodic Table of Elements, which includes noble metals and/or their oxide compounds.

First cathode and positive electrode materials can be provided in a binder material such as a fluoro-resin powder, generally polyvinylidine fluoride or polytetrafluoroethylene (PTFE) powder also includes another electrically conductive material such as graphite powder, acetylene black powder, and carbon black powder. In some cases, however, no binder or other conductive material is required for the first electrode.

Separator material 84 should electrically insulate second electrode 80 from first electrode 82. The material is generally wettable by the cell electrolyte, sufficiently porous to allow the electrolyte to flow through separator material 84, and maintain physical and chemical integrity within the cell during operation. Examples of suitable separator materials include, but are not limited to: polyethylenetetrafluoroethylene, ceramics, non-woven glass, glass fiber material, polypropylene, and polyethylene. As illustrated, separator 84 consists of three layers. A polyethylene layer is sandwiched between two layers of polypropylene. The polyethylene layer has a lower melting point than the polypropylene and provides a shut down mechanism in case of cell over heating. The electrode separation is different than other lithium-ion cells in that two layers of separator are used between second electrode 80 and first electrode 82.

As illustrated, the electrolyte solution can be an alkali metal salt in an organic solvent such as a lithium salt (i.e. 1.0M $LiClO_4$ or $LiAsF_6$) in a 50/50 mixture of propylene carbonate and dimethoxyethane.

Figure 4:
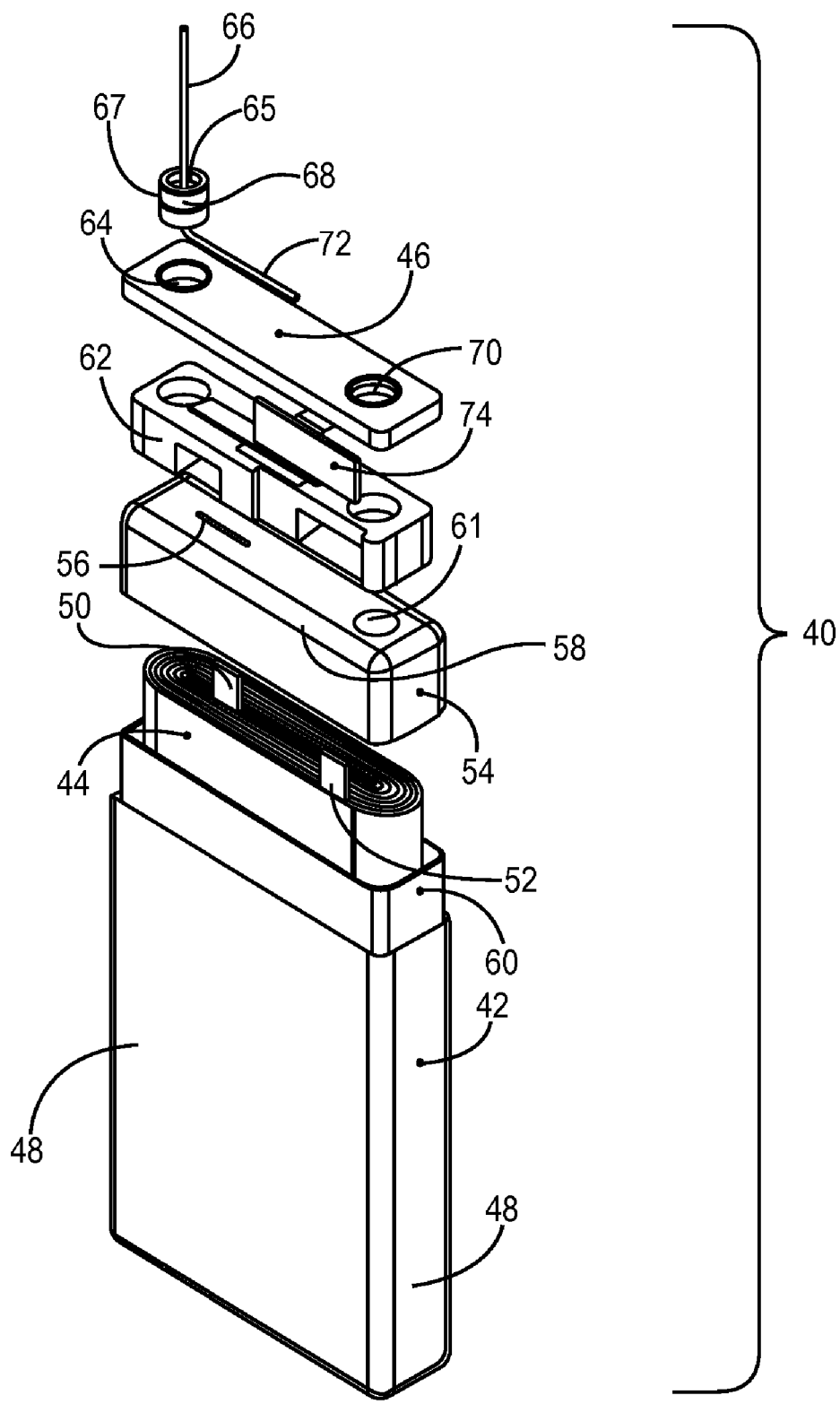
FIG. 4 is an exploded perspective view of a battery case, electrode assembly, case liner, coil insulator, battery cover, and a headspace insulator in an embodiment according to the present invention.

As best seen in FIG. 4, a coil insulator 54 is located on electrode assembly 44 when assembled, which is discussed in more detail below. Coil insulator 54 includes slits 56 and 58 to accommodate first electrode tab 52 and second electrode tab 50. Coil insulator 54 further includes aperture 61 allowing electrolyte to enter and surround electrode assembly 44. Generally insulator 54 is comprised of ETFE, however, it is contemplated other materials could be used such as HDDE, polypropylene, polyurethane, fluoropolymers, and the like. Insulator 54 performs several functions including working in conjunction with case liner 60 to isolate case 42 and cover 46 from electrode assembly 44. It also provides mechanical stability for electrode assembly 44. In addition, it serves to hold electrode assembly 44 together which substantially aids in the manufacturing of battery 40.

Electrode assembly 44 is also generally inserted into an electrically non-conductive case liner 60 during assembly. Case liner 60 generally extends at its top edge above the edge of electrode assembly 44 to overlap with coil insulator 54. Case liner 60 is generally comprised of ETFE, however, other types of materials are contemplated such as polypropylene, silicone rubber, polyurethane, fluoropolymers, and the like. Case liner 60 generally has substantially similar dimensions to case 42 except case liner 60 would have slightly smaller dimensions so it can rest inside of battery case 42.

FIGS. 2 and 4 also depict battery cover 46 and a headspace insulator 62 along with case 42 and electrode assembly 44. Similar to case 42, cover 46 is comprised of medical grade titanium to provide a strong and reliable weld creating a hermetic seal with battery case 42. However, it is contemplated cover 46 could be made of any type of material as long as the material was electrochemically compatible. Illustrated battery cover 46 includes a feedthrough aperture 64 through which feedthrough assembly 68 is inserted. Feedthrough assembly contains a ferrule 67, a insulating member 65, and a feedthrough pin 66. Feedthrough pin 66 is comprised of niobium; however, any conductive material could be utilized without departing from the spirit of the invention. Niobium is generally chosen for its low resistivity, its material compatibility during welding with titanium, and its coefficient of expansion when heated. Niobium and titanium are compatible metals, meaning when they are welded together a strong reliable weld is created.

Feedthrough pin 66 is generally conductively insulated from cover 46 by feedthrough assembly 68 where it passes through cover 46. Insulating member 65 is comprised of CABAL-12 (calcium-boro-aluminate), TA-23 glass or other glasses, which provides electrical isolation of feedthrough pin 66 from cover 46. The pin material is in part selected for its ability to join with insulating member 65, which results in a hermetic seal. CABAL-12 is very corrosion resistant as well as a good insulator. Therefore, CABAL-12 provides for good insulation between pin 66 and cover 46 as well as being resistant to the corrosive effects of the electrolyte. However, other materials besides glass can be utilized, such as ceramic materials, without departing from the spirit of the invention. Battery cover 46 also includes a fill port 70 used to introduce an appropriate electrolyte solution after which fill port 70 is hermetically sealed by any suitable method.

Headspace insulator 62 is generally located below battery cover 46 and above coil insulator 54, i.e., in the headspace above coiled electrode assembly 44 and below the cover 46. Generally, headspace insulator 62 is comprised of ETFE (Ethylene Tetrafluoroethylene), however, other insulative materials are contemplated such as polypropylene. ETFE is stable at both second electrode 80 and first electrode 82 potentials and has a relatively high melting temperature. Headspace insulator 62 preferably covers distal end 72 of feedthrough pin 66, first electrode tab 52, and second electrode tab 50. While electrode assembly 44 is described as having a first and second electrode tab, it is fully contemplated each electrode could have a plurality of tabs without departing from the spirit of the invention. Insulator 62 is designed to provide thermal protection to coiled electrode assembly 44 from the weld joining case 42 and cover 46 by providing an air gap between the headspace insulator and the cover in the area of the case to cover weld. Insulator 62 prevents electrical shorts by providing electrical insulation between the first electrode tab 52, second electrode tab 50, and bracket 74 and their conductive surfaces. Illustrated weld bracket 74 serves as conductor between first electrode tab 52 and battery cover 46. Weld bracket 74 is a nickel foil piece that is welded to both cover 46 and first electrode tab 52.

Battery 40 in FIGS. 2 and 4 can be thought of as consisting of three major functional portions. They are the encasement, insulation, and active component portions. The encasement or closure portion consists of case 42, cover 46, feedthrough assembly 68, fillport 70, ball 112, button 114, and electrical connections. The major functions of the encasement are to provide a hermetic seal, a port for adding electrolyte and isolated electrical connections. The major function of the insulators is to prevent electrical shorts. The insulators consist of headspace insulator 62, coil insulator 54, and case liner 60. The active portion of the cell is where the electrochemistry/energy storage occurs. It consists of the electrolyte and coiled electrode assembly 44. Coiled electrode assembly 44 consists of second electrode 80, first electrode 82, and two layers of separator 84.

Figure 5:
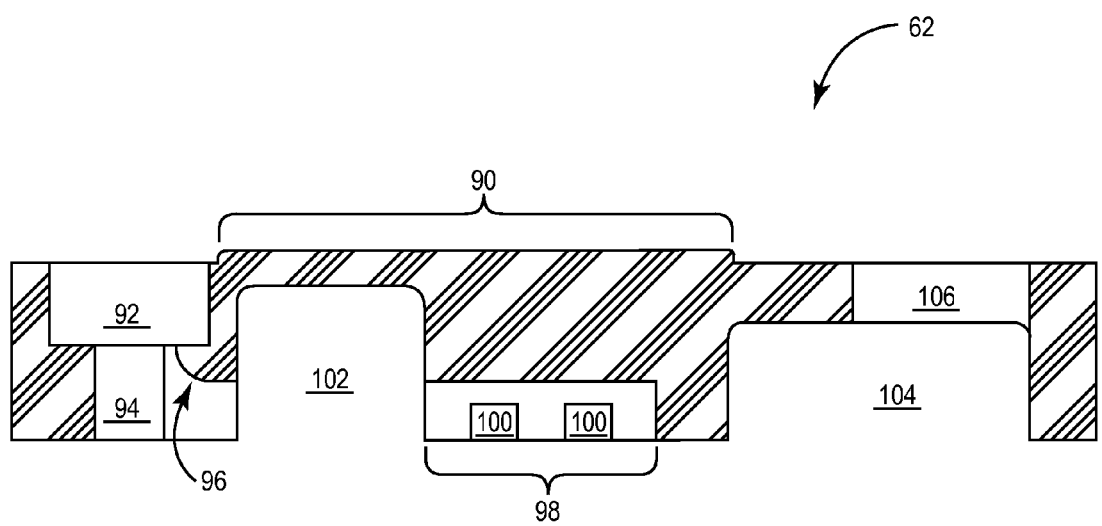
FIG. 5 is a cutaway side profile view of a headspace insulator in the embodiment shown in FIG. 6.
Figure 6:
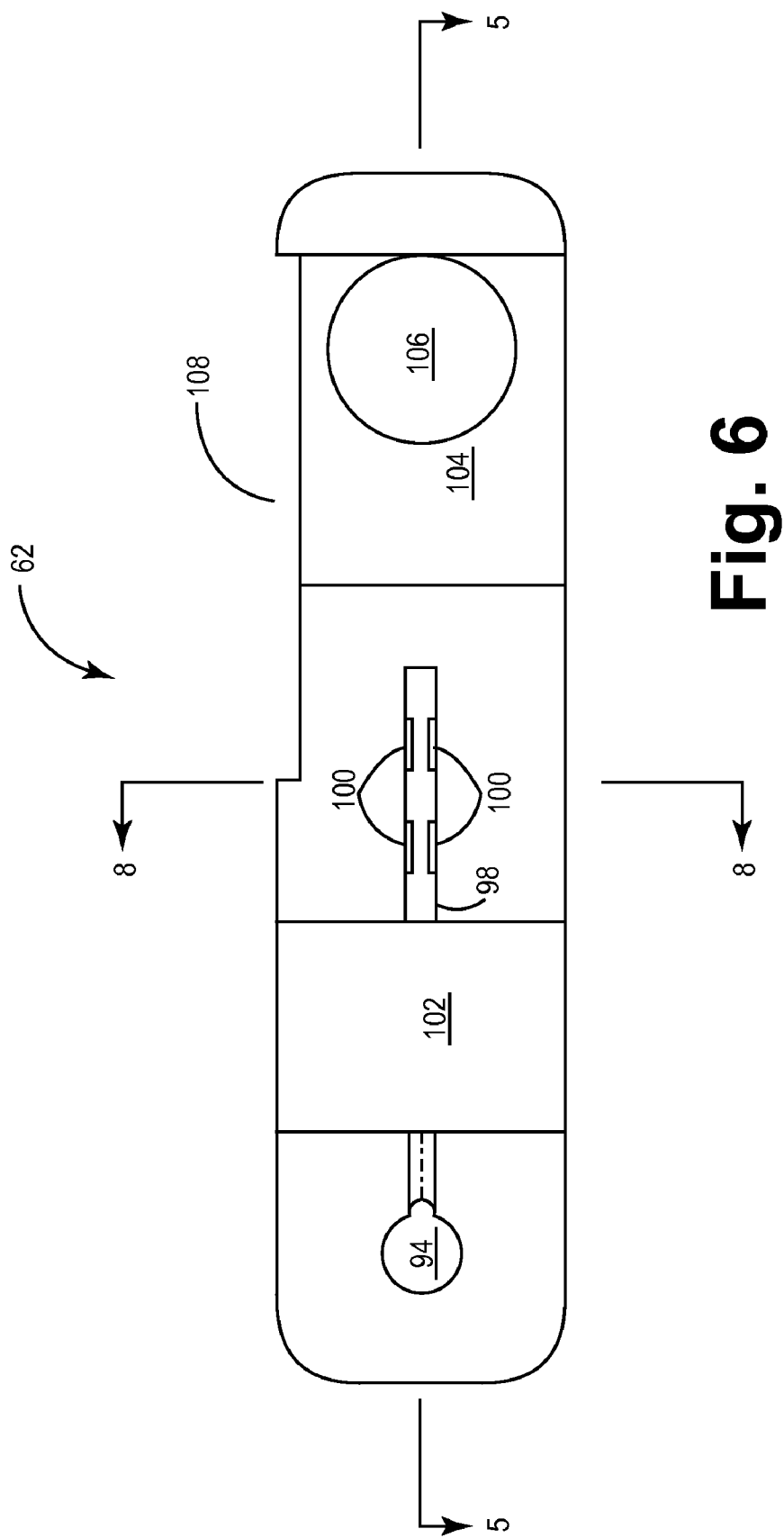
FIG. 6 is an underside profile view of a headspace insulator in an embodiment of the present invention.

With reference to FIG. 5, a cutaway side profile view of a headspace insulator in the embodiment shown in FIG. 6 is shown. As illustrated, headspace insulator 62 has a generally parallelepiped shape and has a solid construction except for portions of insulator 62 which are missing and will be discussed below. A raised portion 90 contacts the underside of battery cover 46 and provides an air gap between cover 46 and insulator 62 near the weld areas where cover 46 and case 42 meet (see FIGS. 7 and 8). Generally, raised portion 90 is positioned to the underside of battery cover 46. It is contemplated insulator 62 could be attached to the underside of battery cover 46 in other fashions, such as, a snapping assembly, or fasteners without departing from the spirit of the present invention. Feedthrough aperture 92 receives feedthrough assembly 68 (shown in FIG. 4) when insulator 62 (shown in FIG. 4) is placed on battery cover 46 (shown in FIG. 4) as will be discussed in detail below. Similarly, pin aperture 94 receives feedthrough pin 66 (shown in FIG. 4). As can be seen, an inner portion of pin aperture 94 has a curvature 96, which provides support for pin 66 when the manufacturer bends pin 66 (shown in FIG. 4) after insertion to place distal end 72 into receiving area 98. Receiving area acts to hold distal end 72 still during any shock or vibration occurrences as well as isolate pin 66 (shown in FIG. 4) from contact with any other polarized surfaces. Indentations 100 assist to hold distal end 72 (shown in FIG. 4) in place once distal end 72 is pressed into receiving area 98, as will be described in more detail below. As can be further seen, there is a second electrode opening 102 for receiving second electrode tab 50 and a first electrode opening 104 for receiving first electrode tab 52. There is also a fillport aperture 106, which allows electrolyte to pass through insulator 62 to electrode assembly 44.

Figure 7:
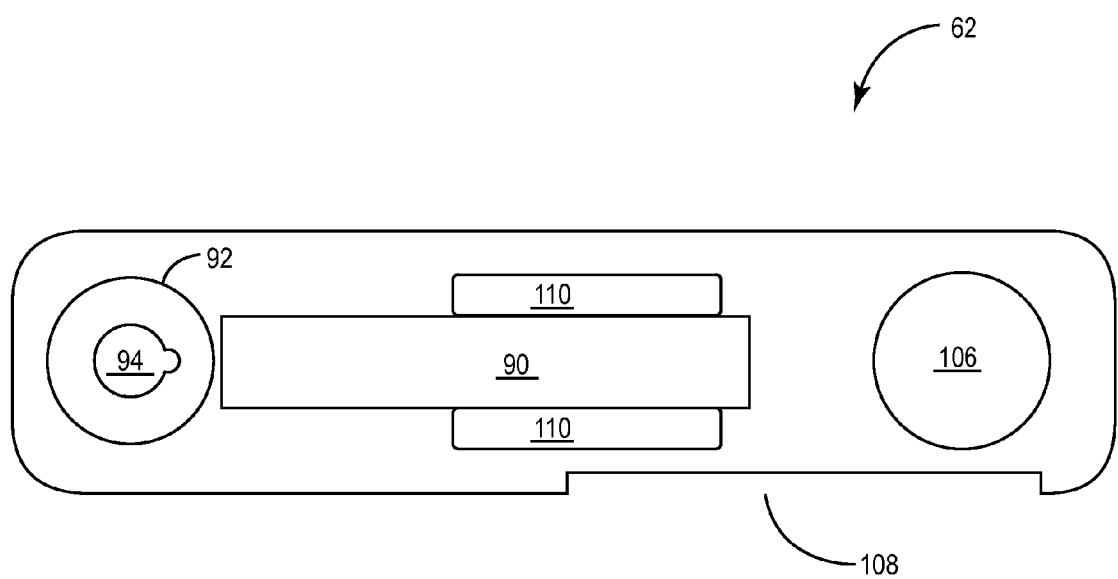
FIG. 7 is an overhead profile view of a headspace insulator in an embodiment of the present invention.
Figure 8:
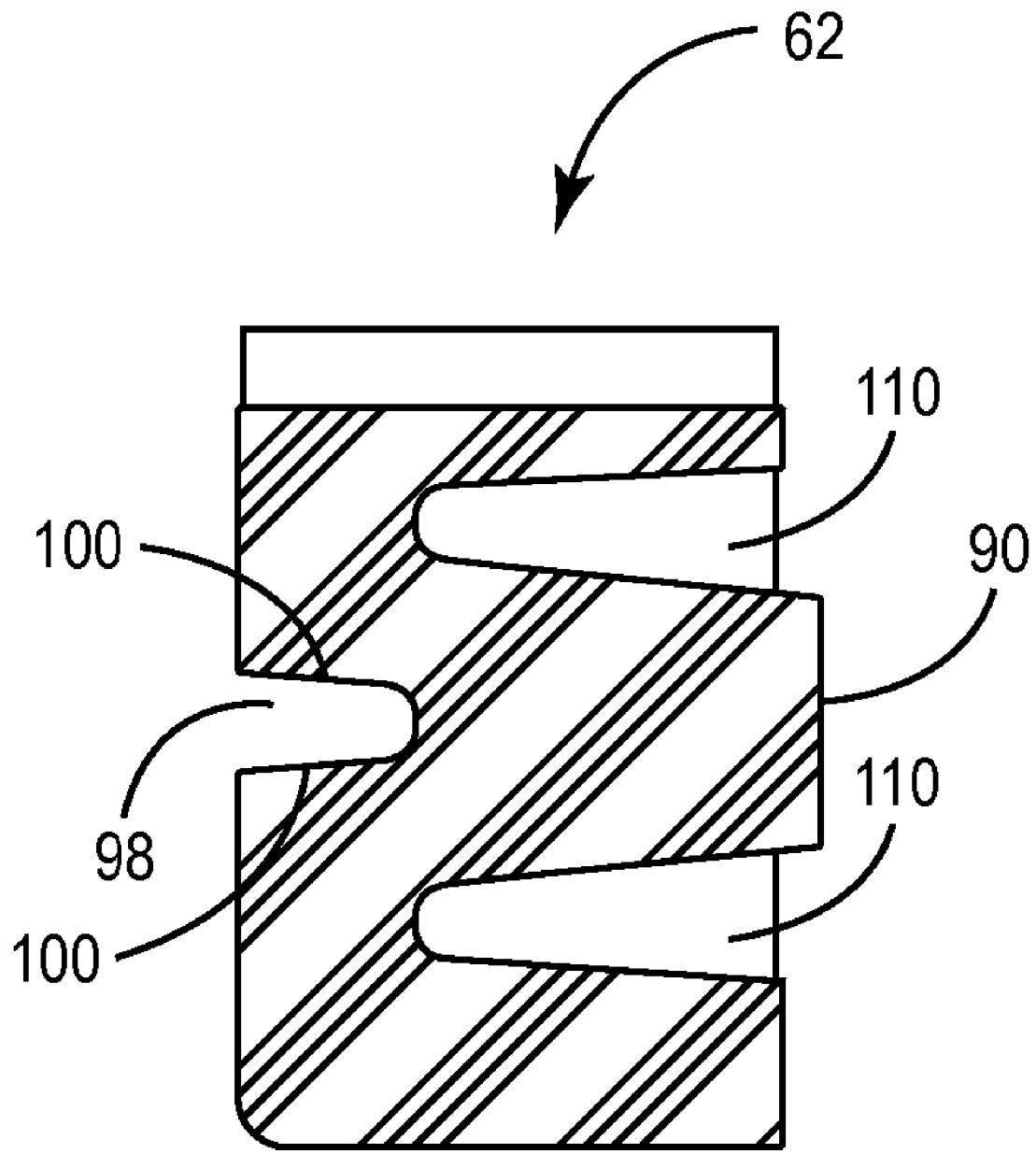
FIG. 8 is a cutaway side profile view of a headspace insulator in the embodiment shown in FIG. 6.

With reference to FIG. 7, an overhead profile view of a headspace insulator in an embodiment of the present invention is shown. Further shown is feedthrough aperture 92, pin aperture 94, raised portion 90, slot 108, side recesses 110 (see FIG. 8) and fillport aperture 106.

With reference to FIG. 7, an overhead profile view of a headspace insulator in an embodiment of the present invention is shown. Further shown is feedthrough aperture 92, pin aperture 94, raised portion 90, slot 108, and fillport aperture 106.

With reference again to FIGS. 2 and 4, battery 40 is generally constructed according to the discussion below. Battery 40 can be put together in three sections. Section one contains battery case 42. Section two contains case liner 60, electrode assembly 44, and coil insulator 54. Section three contains headspace insulator 62, battery cover 46, weld bracket 74, feedthrough pin 66, and feedthrough assembly 68. With section two, case liner 60 and coil insulator 54 are placed over electrode assembly 44 with second electrode tab 50 and first electrode tab 52 extending through slits 56 and 58. With section three, weld bracket 74 is welded to cover 46. Raised portion 90 of headspace insulator 62 is positioned on the underside of cover 62 with slot 108 accepting weld bracket 74. Feedthrough assembly 68 with feedthrough pin 66 is inserted into feedthrough 64 and accepted by feedthrough aperture 92 and pin aperture 94 respectively. Feedthrough pin 66 is then bent over along curvature 96 towards receiving area 98. Feedthrough pin 66 is then placed into receiving area 98 and locked into place by indentations 100. This electrically isolates feedthrough pin 66 from case 42, cover 46, weld bracket 74, first electrode tab 52 or any other element which has an opposing polarity to feedthrough pin 66.

The section three assembly is then aligned with the section two assembly so second electrode tab 50 is accepted within second electrode opening 102 and first electrode tab 52 is accepted within first electrode opening 104 where second electrode tab 50 is adjacent to distal end 72 of feedthrough pin 66 and first electrode tab 52 is adjacent to weld bracket 74. Second electrode tab 50 and distal end 72 of feedthrough pin 66 are then welded together as is first electrode tab 52 and weld bracket 74. It is contemplated other methods of attachment could be used such as rivets and crimping without departing from the spirit of the invention. At this point the assembly can be inserted it into battery case 42. Cover 46 is then laser welded to battery case 42. Battery 40 is then filled full of electrolyte through fill port 70 and sealed with a closing ball 112 and button 114 and welded shut to hermetically seal battery 40. It is contemplated the steps for manufacturing battery 40 can be alternated without departing from the spirit of the invention.

Insulator 62 provides many advantages over the prior solutions. Insulator 62 provides an insulating layer around ferrule 67 that prevents feedthrough pin 66 from electrically shorting to ferrule 67. Insulator 62 provides for receiving area 98 that locates feedthrough pin 66 in a fixed location which is reproducible from battery to battery. Receiving area 98 has indentations which lock feedthrough pin 66 into receiving area 98. Insulator 62 provides for slot 108 to provide a fixed location for weld plate 74. Insulator 62 provides raised portion 90 which provides an air gap and keeps insulator 62 away form the weld areas joining the case 42 to cover 46 to prevent any melting of insulator 62. Insulator 62 provides openings 102 and 104 for the manufacturer to easily weld tabs 50 and 52 to pin 66 and bracket 74 respectively. Insulator 62 isolates the different polarities of battery 40, by creating a physical barrier between tab 50/pin 66 and tab 52/bracket 74/case 42/cover 46. Insulator 62 is fixed with respect to feedthrough pin 66 and tabs 50 and 52, which allows for reproducible and mechanically robust welds. Insulator 62, when assembled with electrode assembly 44 and coil insulator 54, forms an assembly that can be inserted into case 42 without distorting or bending feedthrough pin 66 or tabs 50 and 52.

It will be appreciated the present invention can take many forms and embodiments. The true essence and spirit of this invention are defined in the appended claims, and it is not intended the embodiment of the invention presented herein should limit the scope thereof.

What is claimed is:

1. A headspace insulator for a battery in an implantable medical device, comprising:

a body of electrically and thermally insulating material disposed between a battery electrode assembly and a battery cover, the body having a top surface and a bottom surface;

a receiving area disposed on the bottom surface configured to receive and isolate a battery feedthrough pin; and an engagement mechanism disposed within the receiving area and embedded on the bottom surface configured to receive and engage the battery feedthrough pin, wherein the engagement mechanism comprises indentations that form detents configured to receive a distal end segment of the feedthrough pin and to hold the distal end of the feedthrough pin in place with an interference fit when the distal end of the feedthrough in is received into the receiving area; and wherein the headspace insulator further comprises a raised portion that couples to the battery cover and provides an air gap between the cover and the headspace insulator at locations proximate weld areas of the cover to a case of the battery.

2. A headspace insulator according to claim 1, wherein the headspace insulator further comprises a feedthrough aperture that receives a battery feedthrough assembly.

3. A headspace insulator according to claim 1, wherein the headspace insulator further comprises a pin aperture that receives the feedthrough pin.

4. A headspace insulator according to claim 3, wherein the pin aperture further comprises a curvature that provides support for the feedthrough pin.

5. A headspace insulator according to claim 1, wherein the receiving area restrains motion of the feedthrough pin responsive to abrupt motion of the battery.

6. A headspace insulator according to claim 1, wherein the headspace insulator further comprises a fillport feature adapted to allow a fluidic electrolyte to flow through a portion of the headspace insulator and into the electrode assembly.

7. A headspace insulator according to claim 1, wherein the headspace insulator further comprises a slot that locates a battery weld bracket and isolates it from the feedthrough pin.

8. A headspace insulator according to claim 1, wherein the body of electrically and thermally insulating material comprises a substantially solid, generally parallelepiped shaped unit.

\* \* \* \* \*